Aug. 7, 1945.  J. M. SUMMERS  2,381,233
FASTENER CONSTRUCTION
Filed April 21, 1944
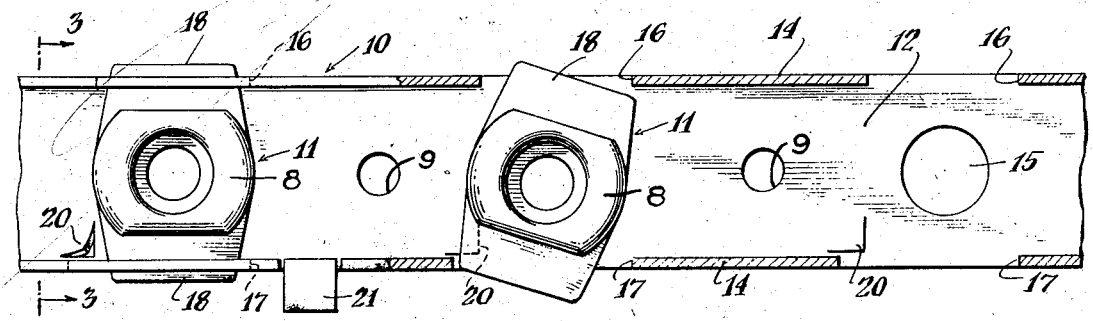
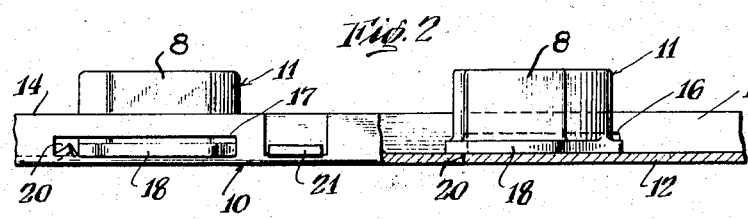
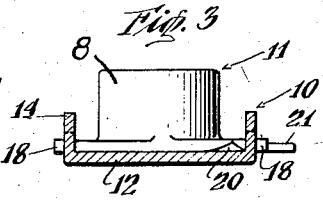
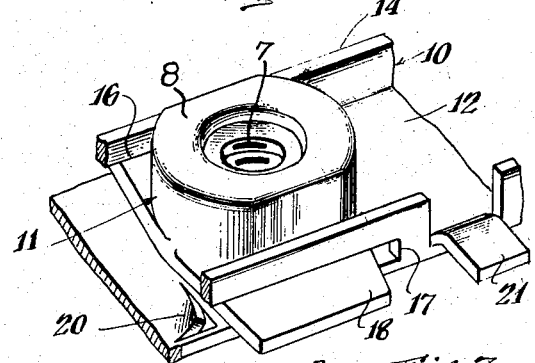
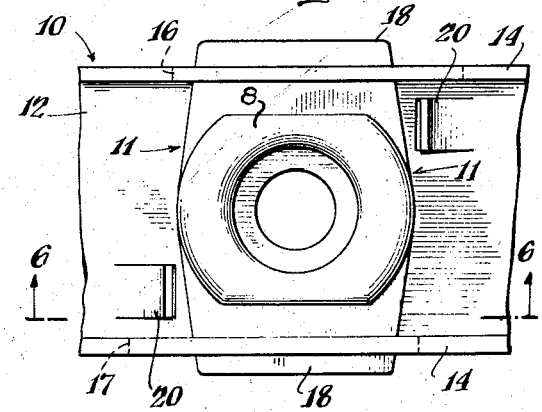
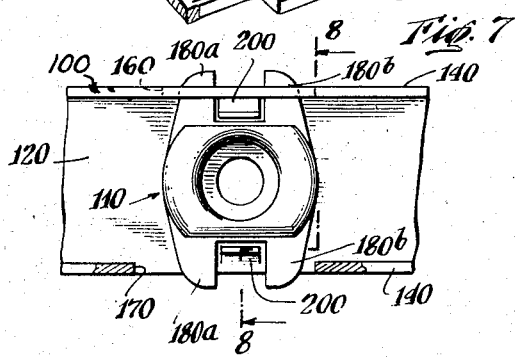
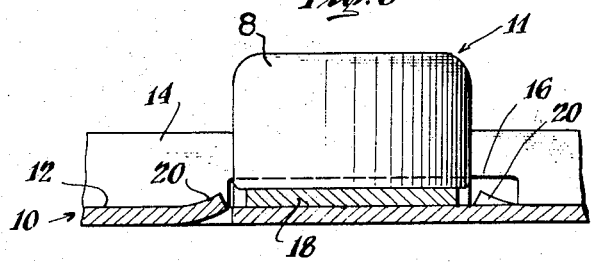
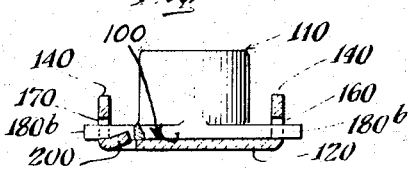
INVENTOR.
J Mills Summers
BY
ATTORNEYS Patented Aug. 7, 1945

2,381,233

UNITED STATES PATENT OFFICE 2,381,233

FASTENER CONSTRUCTION

J Mills Summers, Englewood, N. J., assignor to Camloc Fastener Corporation, New York, N. Y., a corporation of New York Application April 21, 1944, Serial No. 532,094

13 Claims. (Cl. 24—221)

This invention relates to fastener elements of the type known in the trade as "floating" fasteners, in that the fastener elements are adjustably supported within a retainer structure, to accommodate reasonable variations in the locations of complementary fastener elements resulting from inaccuracies of manufacture or the cumulative additive effect of permitted manufacturing tolerances.

It is an object of the invention to provide a fastener structure consisting of retainer and one, or a plurality, of fastener elements removably disposed therein.

It is an object of the invention to provide a fastener structure comprising a retainer and a fastener unit, the unit having limited freedom of movement and adjustment with respect to the retainer.

It is an object of the invention to provide improved means for securing a fastener unit adjustably within a retainer structure.

It is an object of the invention to provide a fastener structure wherein a fastener element thereof may be readily removed from a retainer.

It is an object of the invention to provide an improved retainer for a fastener unit.

In one practical form, the invention may comprise a channel-like retainer characterized by a web or base and substantially vertical walls arranged in spaced relationship, the said base being provided at desired intervals with apertures to accommodate the passage of fasteners such as bolts, machine screws, or studs.

In suitable disposition with respect to each such aperture, the walls of the retainer are provided with relatively long slots which conveniently, although not necessarily, are arranged in the plane of the base.

Operatively associated with the retainer is a fastener unit, which may be a threaded structure such as a nut, or other type such as the cam collar disclosed in my U. S. Patent No. 2,239,125, dated April 22, 1941. Said nut or cam collar rests upon the base of the retainer; the body of the nut or cam collar is provided with extending flanges or wings which, when positioned within the retainer, pass through the slit-like openings in the walls of the retainer.

To permit the fastener units to be positioned within the retainer, either one or both of the slots in the walls thereof is made considerably longer than the width of the fastener unit flange which ultimately projects therethrough. When but one of the two slots is of such extreme length, the other is but slightly longer than the width of the fastener unit flange.

To position the fastener unit and to secure it with respect to the retainer, the unit is placed on the web of the retainer with its wings extending substantially lengthwise of the retainer, and then rotated in the plane of the base thereof so that the wings of the unit pass through the slots of the retainer walls. The oversize slot in at least one of the walls renders it possible to insert the fastener unit in the manner stated. To secure the fastener units in said position, the base of the retainer adjacent that wing of the unit which passes through the oversize slot, is struck upwardly to form a tab adjacent the wing of the fastener unit, to prevent rotation of the unit to such extent that it could again be removed from its retainer.

When both of the flanges of the retainer are provided with oversize slots, two tabs are struck from the base of the retainer, suitably adjacent each wing.

It is desirable to place the tabs in such location that upon tightening a screw into the fastener unit, if the same be a nut, the nut will rotate away from the tab, eventually to strike against the solid end wall of the slots.

In another practical embodiment, one or both of the flanges of a fastener unit may be bifurcated, and a tab or tabs struck upwardly from the retainer suitably within the space afforded by the bifurcation.

In the drawing:

Fig. 1 is a top plan view of one form of fastener assembly according to the present invention, said figure disclosing a method of inserting a fastener unit into the retainer;

Fig. 2 is a side elevation of Fig. 1;

Fig. 3 is an end elevation taken on lines 3—3 of Fig. 1, showing the fastener unit in secured position within the retainer;

Fig. 4 is a perspective, partly in section, showing a fastener unit positioned within a retainer;

Fig. 5 is a top plan view of a second form of fastener assembly;

Fig. 6 is an elevation, in section along lines 6—6, of the structure of Fig. 5;

Fig. 7 is a top plan view of a third form of fastener unit and retainer; and

Fig. 8 is a vertical section thereof, on lines 8—8 of Fig. 7.

Referring to Figs. 1 to 4 of the drawing, the present invention comprises a retainer 10 and a fastener unit 11, illustratively a nut, adjustably held thereby. The retainer 10 is preferably of channel formation, having a base 12 and upwardly extending side walls 14, 14. The retainer may be for a single fastener unit, or any desired plurality thereof, spaced as required; at locations to be occupied by the respective fastener units, the base of the retainer is apertured, as at 15, to allow for the passage of the screw or stud through the retainer for engagement with the fastener unit.

Other apertures 9 through the retainer base accommodate a rivet or the like for securing the retainer to a structure.

In registry with said opening or openings 15, the walls 14 of the retainer 10 are pierced with relatively long slots 16, 17, said slots desirably being generally in the plane of the base 12 of the retainer, as shown.

The fastener unit 11 includes a body portion 8 and flanges or wings 18 extending from opposite sides thereof; upon positioning the unit within the retainer, said wings extend through the respective slots. The respective slots 16, 17 in the side walls, are each greater in length than the length of the immediately adjacent portion of the wings 18 of the units 11, so that limited longitudinal movement of the units 11 with respect to the retainers 10, is permitted. Likewise, there is a similar or greater degree of permitted movement in a direction transversely of the retainer 10, said movement being limited either by eventual engagement of the sides of the flanges 18 with the ends of the respective slots, or by engagement of the body portion 8 of the unit 11 with the side walls of the retainer.

At least one of the slots, see 17, Fig. 1, is substantially longer than the maximum width of the associated flange 18, and such extended length of slot permits the units to be inserted into the retainer by initially placing the unit on the base 12 of the retainer, with its longer dimension substantially parallel to the length of the retainer, then rotating the unit in the plane of the retainer to bring the wings 18 of the unit through the respective slots. It will be apparent that if each of the slots through the side walls of the retainer were of the length of slot 16, Fig. 1, it would be difficult to rotate the units to bring the wing portions through the respective slots.

To secure the unit 11 in the retainer after insertion, means are provided, limiting the rotation of the unit with respect to the retainer, so that it cannot again be displaced to a degree which would bring the wings of the unit out of the slots. A simple and highly effective way of so securing the units 11 is by striking up a tab 20 from the base 12 of the retainer, thereby raising an abutment adjacent the side margin of the wing portion 18 which extends through the longer slot.

As appears from Fig. 1, the disposition of the tab 20 and particularly the transverse wall thereof, reduces aperture 17 to the equivalent in length, of the aperture 16.

The bore of the fastener unit, when the unit is in the inserted position illustrated in Fig. 1, is in registry with the aperture 15 in the base of the retainer, and said aperture 15 is sufficiently large that with the unit 11 displaced with respect to the retainer 10 to the maximum degree provided by the dimensional clearances, there is always unrestricted communication through the base of the retainer 12 to the bore of the fastener unit 11.

When the fastener unit is a nut, as shown, the assembly of retainer and nut is so mounted on the structure to which attachment is to be made, that the base of the flange is against the surface of the structure—which, of course, is suitably apertured—and the machine screw or bolt is passed through the structure and the aperture 15, to enter the fastener unit 11 from the rear. Assuming a right-hand thread 7, the nut will be subjected to a rotation counterclockwise of Fig. 1 upon making up the screw into the nut. It is therefore desirable to strike the tab 20 at the side of the fastener unit 11 which is away from the direction of rotation of the unit, so that the unit will be restrained against rotation by engagement of its flange portion with the wall 14 of the retainer, rather than by engagement of the flange portion with the struck-up tab 20. During the stage of unscrewing, reverse rotation takes place, and the flange 18 will strike against the edge of the tab 20 and be restrained against rotation; but during this operation the rotative strain imposed upon the nut 11 is less than when it is turned in the opposite direction to tightened relation, as will be understood. The tab 20 will not be overridden or subjected to such pressure that it will be damaged.

In the embodiment illustrated in Figs. 5 and 6, each opening 17 through the walls 14 of the retainer 10 is of maximum width, and after the unit 11 is positioned within the retainer, with the wings 18 thereof extending through the apertures thereof, a pair of tabs 20, 20 is struck up from the base 12 of the retainer. The disposition of the tabs 20 with respect to the rotation of the nut 11 is as above discussed, so that the nut will be restrained against rotation by engagement with the end walls of the slots 16, 17.

In order to space a retainer 10 away from a wall or solid structure, and thus to retain the characteristic of adjustability of the units 11 with respect to the retainers, the wall or walls 14 of the retainer may, at convenient intervals, be flanged outwardly, as shown in Fig. 4, to provide a short tab or extension 21 which projects beyond the wall 14 greater than does the wing 18 of the unit 11 when the unit is displaced laterally with respect to retainer 10 to the maximum extent permitted by the relative dimensions of the assembly.

In a third embodiment of the invention, see Figs. 7 and 8, a retainer 100 is similar in configuration to the retainer 10 of Fig. 1, and accordingly has side walls 140, 140 having slots 160, 170 in the plane of the base 120.

The fastener unit housing 110 has spaced flanges 180a, 180b at its respective sides, instead of the imperforate flanges 18 of the housing 11.

The lengths of the slots 160, 170 are the same, relative to the housing 110, as the corresponding slots 16, 17, of Fig. 1, thereby affording means for inserting the housing 110 into position in the retainer. To secure the housing in position within the retainer, tabs 200 are struck up from one or both sides of the retainer 100, said tabs projecting upwardly and within the space between the flanges 180a, 180b. The relative dimensioning of the respective parts is again such as to afford a limited degree of transverse and lateral adjustability.

Whereas it is obvious that among others the several objects of the invention as specifically afore noted are achieved, it is apparent that numerous changes in construction and rearrangements of the parts might be resorted to without departing from the spirit of the invention as defined by the claims.

I claim:

1. A floating fastener comprising a channel member, the side walls and base thereof having apertures which are generally in transverse alignment, a fastener element disposed on said base, said fastener element being provided with a body and wing portions, the wing portions extending through the apertures in said side walls, the maximum length from wing to wing of the fastener element being greater than the maximum transverse dimension of the channel, and the width of the body of the fastener being less than the inner wall to wall dimension of the channel member, whereby said fastener element may be positioned between the side walls of the channel member, the length of the apertures being such that rotation of the fastener element in the plane of the base will permit the said wing portions to enter and extend through the respective apertures; and an abutment extending upwardly from the base adjacent the fastener element to prevent such rotation of the same which would permit removal from the retainer.

2. A floating fastener comprising a retainer member having a base, spaced wall means extending upwardly from said base and defining therewith elongate apertures in substantial registry, a fastener element disposed on said base and having flanges extending through said apertures, the width of said flanges being less than the length of said apertures, and an abutment extending upwardly from said base adjacent said fastener element to loosely hold the fastener element within said retainer.

3. A floating fastener comprising the combination with a member having a base and side walls, said side walls having apertures in mutual registry, of a fastener element disposed on said base and having wing portions extending through said apertures, the length of said apertures being greater than the width of the wing portions, and tab means extending upwardly from said base intermediate the ends of the respective side wall apertures and disposed adjacent one of said wing portions to retain the fastener element relatively loosely within the side wall apertures.

4. A floating fastener comprising the combination with a retainer having a base and side walls extending upwardly therefrom, said side walls having apertures, a fastener element disposed on said base and having wing portions extending through said apertures, the length of one of said apertures being materially greater than the width of its associated wing portion, and an abutment extending upwardly from the retainer base intermediate the ends of said longer apertures and engageable with the adjacent wing portion to hold the fastener element relatively loosely in association with the retainer.

5. A fastener comprising a retainer having a base and spaced side walls, said side walls having elongate apertures therethrough, a fastener unit disposed intermediate said side walls and having wing portions extending through the apertures thereof, the length of the said apertures being materially longer than the width of the wing portions, to permit the said wing portions to pass through the side walls by rotation of the fastener unit in the plane of the base, and abutments extending upwardly from the base adjacent the said wing portions, to reduce the effective length of the side wall apertures to prevent rotation of the fastener unit to an extent sufficient to withdraw the wing portions through the apertures.

6. A fastener unit comprising a retainer having spaced side walls, said side walls having elongate apertures in mutual registry, one of said apertures being longer than the other, a fastener unit disposed intermediate said side walls and having wing portions extending through the apertures thereof, and tab means on said retainer adjacent a side edge of one of said wing portions for reducing the effective length of said longer aperture to a length substantially equal to the length of the shorter aperture.

7. A fastener unit comprising a retainer having spaced side walls, elongate apertures in said side walls, in mutual registry, one of said apertures being materially longer than the other, a fastener unit disposed intermediate said side walls and having wing portions extending through the apertures thereof, and an abutting wall in said retainer adjacent the longer of the side wall apertures thereof to reduce the effective length of said longer aperture to a length substantially equal to that of the shorter aperture.

8. A fastener comprising, in combination, a retainer having a base and upwardly extending wall portions, apertures in the side walls, a fastener unit disposed on said base and having wing portions projecting through the apertures in said side wall, one of said side wall apertures being substantially longer than the width of the wing portion extending therethrough, and an abutment in said retainer disposed intermediate the ends of said longer aperture and adjacent a side edge of said wing portion.

9. A fastener comprising a retainer having a base and side walls extending upwardly therefrom, elongate apertures formed in said side walls, a nut positioned between said side walls, said nut having wing portions extending laterally therefrom for passage into said side wall apertures, the length of one of said apertures being materially in excess of the width of its associated wing portion, and an abutment provided on said retainer adjacent the said longer aperture to reduce the effective length thereof substantially to that of the shorter aperture, said abutment being so disposed with respect to the said wing portion that the tendency of the nut to rotate upon the insertion of a screw thereinto will be away from the said abutment.

10. A floating fastener comprising a retainer member having a base and spaced wall means extending upwardly therefrom, said wall means defining with the base, elongate apertures in mutual registry, a fastener unit having spaced flanges extending from opposite sides thereof, said spaced flanges extending through the respective apertures in relatively loose association with said side walls, said base having raised portions between the spaced flanges to limit the movement of the fastener unit with respect to the base.

11. A floating fastener comprising a retainer member having a base and spaced side walls having apertures therein which are generally aligned transversely, a fastener unit disposed on said base and having flanges extending laterally through such aligned apertures, at least one of said flanges being bifurcated, and a tab struck upwardly from said base and projecting into the area between the flange bifurcations to a height substantially equivalent to the thickness of the flange; the width of the tab being less than the width of the said area.

12. A fastener unit comprising a retainer having a base and side walls, said side walls having elongate apertures therein, a fastener unit having wing portions extending through the apertures in said side walls, and an abutment formed in said retainer adjacent one of said wing portions.

13. A fastener comprising a retainer having spaced side walls, said side walls having apertures therethrough, a fastener unit disposed between said side walls and having wing portions extending through said apertures, the effective length of said apertures being such that a limited longitudinal movement is permitted said fastener unit, and a flange extending outwardly from a side wall of said retainer and projecting beyond the maximum extent of projection of a wing portion of said fastener unit through the said aperture.

J. MILLS SUMMERS.